US009822820B2

(12) United States Patent
Kegeler (10) Patent No.: US 9,822,820 B2
(45) Date of Patent: Nov. 21, 2017

(54) SENSOR ARRANGEMENT HAVING AN ANGLE SENSOR AND A ROLLING BEARING ARRANGEMENT

(71) Applicant: Schaeffler Technologies AG & Co. KG, Herzogenaurach (DE)

(72) Inventor: Joerg Kegeler, Schleusingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 122 days.

(21) Appl. No.: 14/652,674

(22) PCT Filed: Nov. 7, 2013

(86) PCT No.: PCT/DE2013/200280
§ 371 (c)(1),
(2) Date: Jun. 16, 2015

(87) PCT Pub. No.: WO2014/094752
PCT Pub. Date: Jun. 26, 2014

(65) Prior Publication Data
US 2015/0337903 A1    Nov. 26, 2015

(30) Foreign Application Priority Data

Dec. 20, 2012    (DE) .................. 10 2012 223 942

(51) Int. Cl.
*F16C 41/00*     (2006.01)
*F16C 19/26*     (2006.01)
(Continued)

(52) U.S. Cl.
CPC ............ *F16C 41/007* (2013.01); *F16C 19/26* (2013.01); *G01B 7/30* (2013.01); *G01D 5/20* (2013.01); *G01P 3/443* (2013.01); *F16C 19/06* (2013.01)

(58) Field of Classification Search
None
See application file for complete search history.

(56) References Cited

U.S. PATENT DOCUMENTS

| 5,434,503 A | 7/1995 | Rigaux et al. |
| 6,043,643 A | 3/2000 | Message et al. |
| (Continued) | | |

FOREIGN PATENT DOCUMENTS

| DE | 10 2010 021160 | 11/2011 |
| JP | 2003322547 | 11/2003 |
| WO | WO 2011/134955 A2 | 11/2011 |

*Primary Examiner* — Jermele M Hollington
*Assistant Examiner* — Douglas X Rodriguez
(74) *Attorney, Agent, or Firm* — Davidson, Davidson & Kappel, LLC (57) ABSTRACT

The invention relates to a sensor arrangement having an angle sensor for the measurement of rotations. The angle sensor is multipolar such that measurements are possible by means of n poles. First of all the angle sensor comprises a sensor ring surrounding an axis of rotation (04) and a material measure which is rotatable relative to said sensor ring. A transmitting coil (27) and a plurality of receiving coils (28) are disposed on the sensor ring. Between the transmitting coil (27) and the receiving coils (28) a magnetic circuit is formed which comprises the material measure and a pot core (17) having two branches (19). To this end the material measure forms a variable reluctance in the magnetic circuit. One of the two branches (19) of the pot core (17) is segment-like, such that said branch comprises ring segments (38). In each case the receiving coils (28) surround one of the ring segments (38). The ring segments (38) each form an arc of a circle having a mean radius (43, 46, 48, 51). According to the invention the mean radii (43, 46, 48, 51) of the circular arcs of two adjacent ring segments (42, 49; 44, 42; 47, 44; 49, 47) in each case have an angle ($\epsilon$, $\zeta$, $\eta$, $\theta$) relative to one another which is simply the integral or a (Continued)

multiple of the nth fraction of the right angle. The invention further relates to a rolling bearing arrangement (1).

11 Claims, 9 Drawing Sheets

(51) Int. Cl.
*G01B 7/30* (2006.01)
*G01D 5/20* (2006.01)
*G01P 3/44* (2006.01)
*F16C 19/06* (2006.01)

(56) References Cited

U.S. PATENT DOCUMENTS

| | | | |
|---|---|---|---|
| 2005/0225320 A1* | 10/2005 | Lee | G01D 5/2053 324/207.17 |
| 2006/0104558 A1 | 5/2006 | Gallion et al. | |
| 2006/0279277 A1 | 12/2006 | Kishi et al. | |
| 2010/0102803 A1* | 4/2010 | Kobayashi | G01D 5/2013 324/207.25 |
| 2013/0113470 A1 | 5/2013 | Kegeler et al. | |
| 2013/0271122 A1* | 10/2013 | Kino | G01B 7/30 324/207.25 |

* cited by examiner

SENSOR ARRANGEMENT HAVING AN ANGLE SENSOR AND A ROLLING BEARING ARRANGEMENT

The present invention relates to a sensor arrangement having an angle sensor for measuring rotations. The present invention furthermore relates to a rolling bearing arrangement which includes the sensor arrangement according to the present invention.

BACKGROUND

A generic sensor arrangement and a generic rolling bearing arrangement are known from WO 2011/134955 A2. The generic rolling bearing arrangement is illustrated in a perspective cross-sectional representation in the appended FIG. 2. To begin with, the rolling bearing arrangement includes a rolling bearing 01, to which an angle sensor 02 is attached, axially adjacent thereto. Rolling bearing 01 includes an inner ring 03 and an outer ring 06, which is rotatable around inner ring 03 around a rotation axis 04. Rolling elements 07 in the form of balls are situated between inner ring 03 and outer ring 06. Rolling elements 07 are held in a cage 08 (illustrated in FIG. 3). The space between outer ring 06 and inner ring 03 is sealed to the outside by a sealing washer 09.

Figure 2:
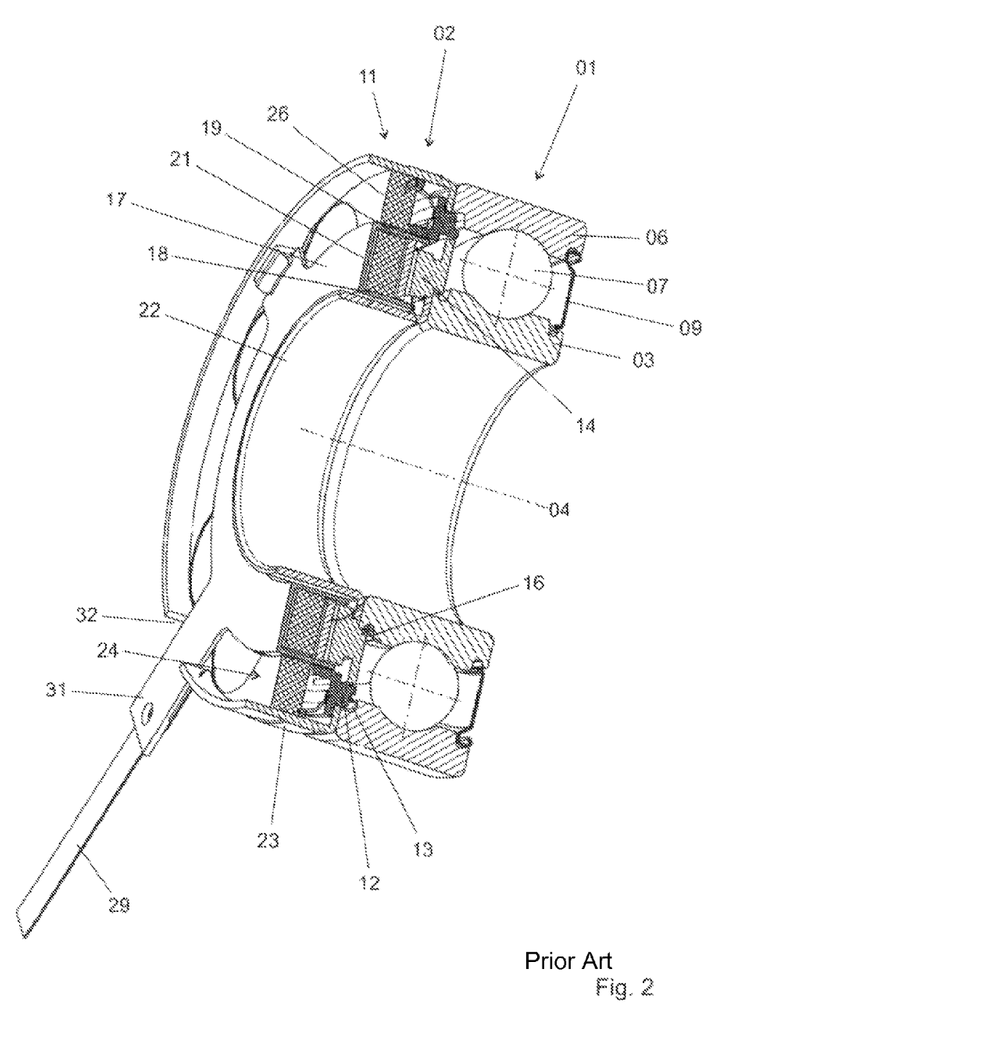
FIG. 2: shows a perspective cross-sectional representation of a generic rolling bearing arrangement according to the prior art.

Angle sensor 02 includes a sensor ring 11, which is fastened on outer ring 06 in a circumferential groove 13 provided in outer ring 06, with the aid of a holding element 12. However, sensor ring 11 is not rotatably fixedly fastened on outer ring 06, since annular holding element 12 is able to rotate around rotation axis 04 in circumferential groove 13. The rotatably non-fixed design of the fastening is due to the circumstance that outer ring 06 is slightly rotated in the machine element (not illustrated) accommodating outer ring 06 during a longer operation. Due to the rotatably non-fixed design of the fastening, sensor ring 11 may retain its angle position on rotation axis 04, so that the measurements using the angle sensor are not corrupted.

Angle sensor 02 furthermore includes a material measure 14, which is rotatably fixedly fastened to inner ring 03 in a circumferential groove 16 provided in inner ring 03. Material measure 14 has an eccentric annular shape and is illustrated in detail in FIGS. 9 and 10. Material measure 14 closes the U-shaped cross-sectional shape of a U-shaped pot core 17, which is fastened in sensor ring 11. Annular pot core 17 is made of a ferromagnetic material. The U-shaped cross section of pot core 17 forms an inner U-leg 18 and an outer U-leg 19, which are angled against a U-base 21.

Sensor ring 11 includes an inner supporting ring 22 and an outer supporting ring 23, an annular space 24 being provided between inner supporting ring 22 and outer supporting ring 23, in which pot core 17 and a p.c. board 26 are situated. P.c. board 26 is shown in detail in FIG. 4. A transmitter coil 27 (illustrated in FIG. 4) and receiver coils 28 (illustrated in FIG. 4) are provided on p.c. board 26. Transmitter coil 27 and receiver coil 28 are electrically connectable with the aid of a cable 29. Cable 29 is guided to the outside of annular space 24 through a recess 32 in outer supporting ring 23 with the aid of a cable holder 31 on pot core 17. Cable holder 31 is furthermore used to rotatably fixedly fix pot core 17 and p.c. board 26 with respect to the machine element (not illustrated) accommodating the rolling bearing arrangement.

Figure 3:
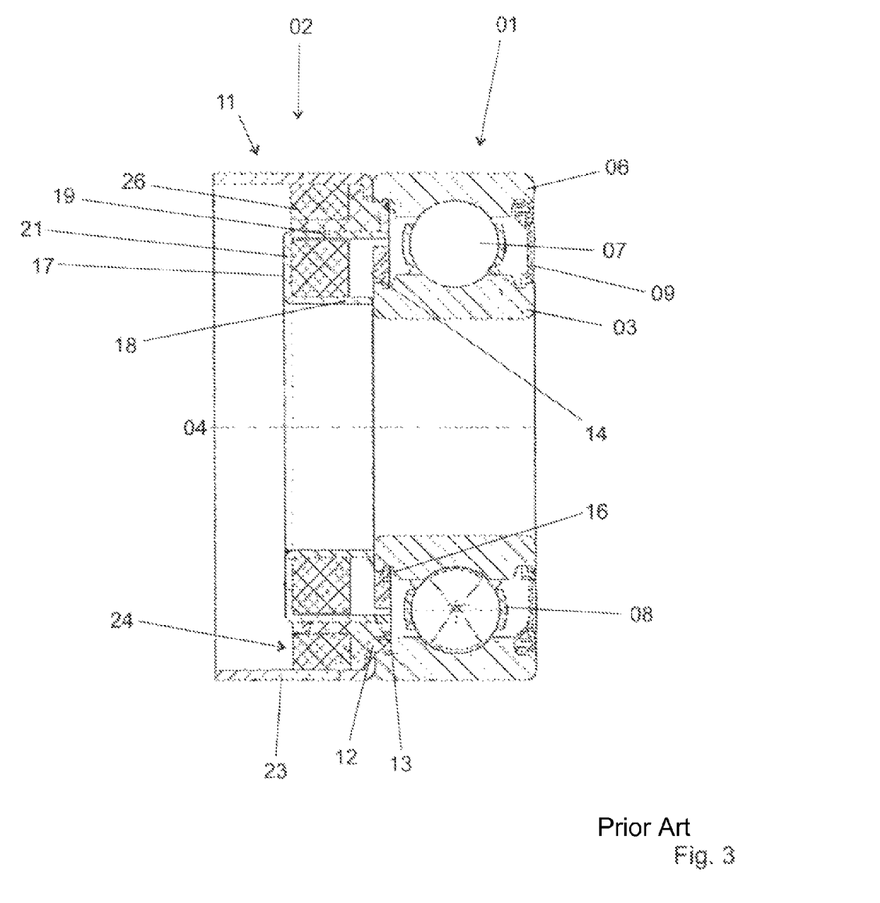
FIG. 3: shows a cross-sectional representation of the rolling bearing arrangement illustrated in FIG. 2.

FIG. 3 shows a cross-sectional representation of the rolling bearing arrangement illustrated in FIG. 2.

Figure 4:
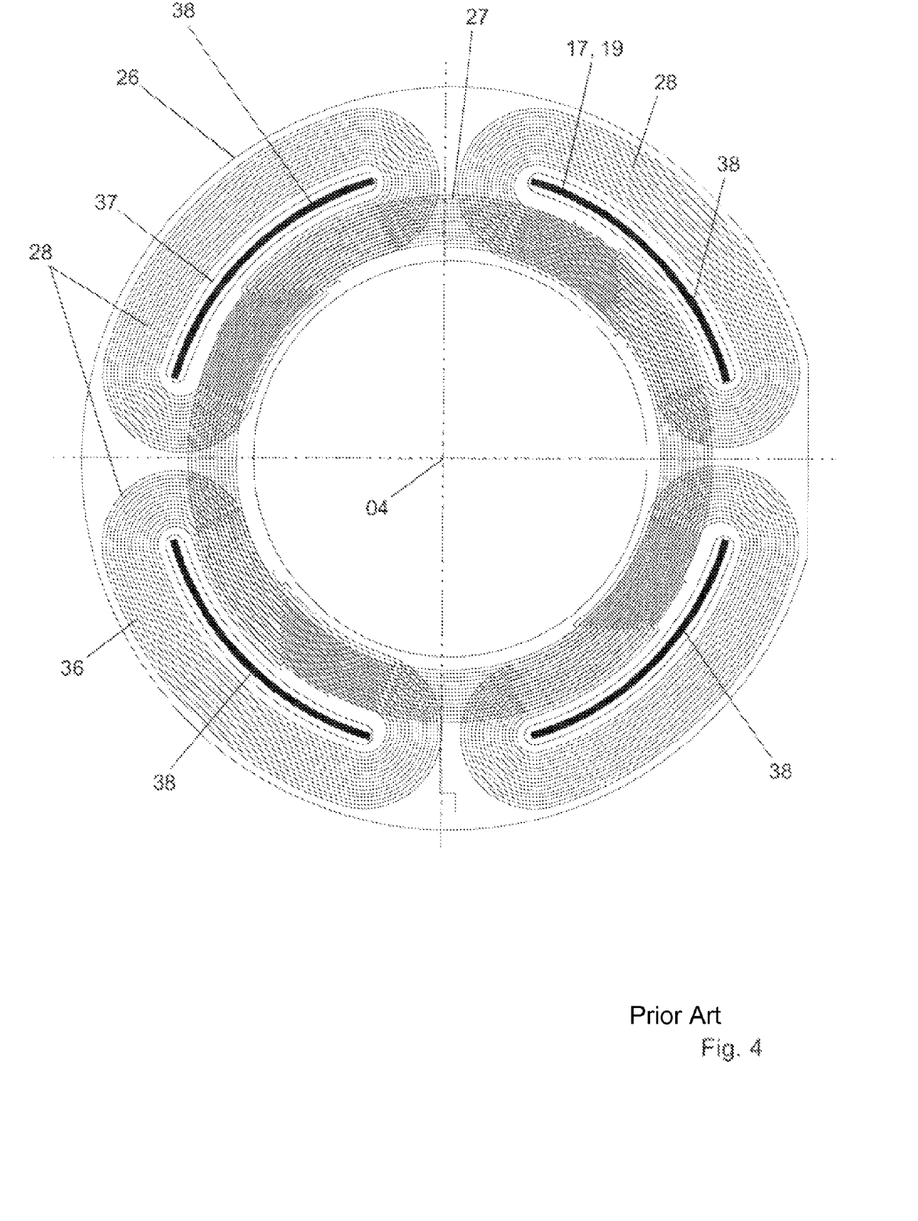
FIG. 4: shows a detailed representation of a p.c. board illustrated in FIG. 2.

FIG. 4 shows a detailed representation of p.c. board 26 illustrated in FIG. 2. Transmitter coil 27 and receiver coils 28 are provided on p.c. board 26. P.c. board 26 is a printed-circuit board which includes multiple layers, transmitter coil 27 and receiver coil 28 being designed as printed conductors 36. P.c. board 26 has four evenly distributed openings 37 of the same design. Openings 37 each have the shape of a circular ring segment. The circular ring segments each have a center point angle of approximately 60°. Outer U-leg 19 of pot core 17 is guided through openings 37, so that pot core 17 completely surrounds transmitter coil 27, while it surrounds receiver coils 28 only approximately halfway. Outer U-leg 19, which has an annular design, is interrupted in its annular shape, so that it is able to project through openings 37. Due to the interruptions in the annular shape of outer U-leg 19, ring segments 38 are provided, each of which has the shape of a circular arc. Circular arcs each have a center point angle of approximately 60°.

Figure 9:
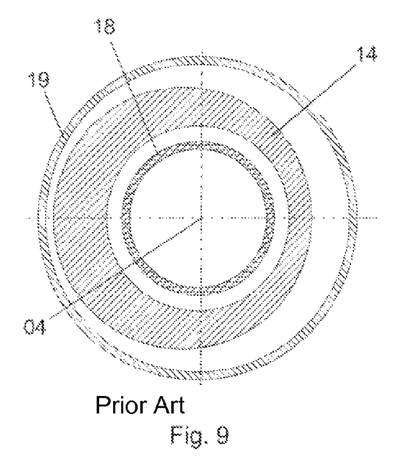
FIG. 9: shows a material measure, which is known from the prior art for the rolling bearing arrangement illustrated in FIG. 2.

FIG. 9 shows one embodiment of a material measure 14, which is known from the prior art for the rolling bearing arrangement illustrated in FIG. 2. Material measure 14 is illustrated in a cross-sectional view perpendicularly to rotation axis 04, outer U-leg 19 and inner U-leg 18 furthermore being shown. During a rotation of material measure 14 with respect to pot core 17 (illustrated in FIG. 2), the material measure results in a variable reluctance of the magnetic circuit formed by pot core 17 and material measure 14 with regard to individual receiver coils 28 (illustrated in FIG. 4), since material measure 14 is provided with an eccentric design. The eccentricity of material measure 14 is due to the fact that a ring width of annular material measure 14 circumferentially changes, namely from a minimum ring width to a maximum ring width and back to a minimum ring width.

Figure 10:
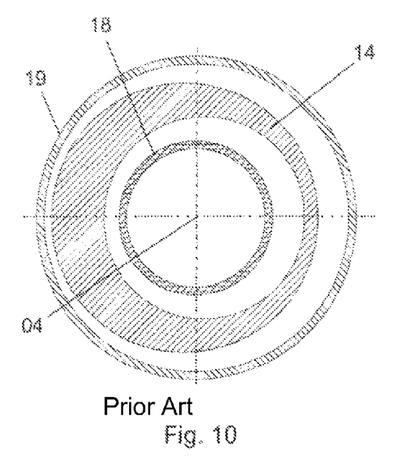
FIG. 10: shows a detailed view of the material measure illustrated in FIG. 2.

FIG. 10 shows a detailed view of material measure 14 illustrated in FIG. 2. In contrast to the material measure illustrated in FIG. 9, material measure 14 in FIG. 10 has a double eccentric design, since both the outer circumference of material measure 14 and the inner circumference of material measure 14 have an eccentric design. As a result, the angle sensor is less susceptible to movements of U-legs 18, 19 perpendicular to rotation axis 04.

The design of ring segments 38 (shown in FIG. 4) is not illustrated for outer U-legs 19 illustrated in FIG. 9 and FIG. 10.

The rolling bearing arrangement shown in WO 2011/134955 A2 facilitates absolute angle measurements between 0° and 360°. As a result, it is suitable, for example, for supporting a shaft of a monopolar electric motor. Angle sensor 02 illustrated in FIGS. 2 through 4 is therefore also characterized as being monopolar.

SUMMARY OF THE INVENTION

Based on the approach shown in WO 2011/134955 A2, it is an object of the present invention to provide a rolling bearing arrangement and a sensor arrangement suitable therefor, with the aid of which a multipolar angle measurement, in particular on multipolar electric motors, is made possible.

The indicated object is achieved by a sensor arrangement according to the appended claim 1 as well as by a rolling bearing arrangement according to the other appended independent claim 10.

The sensor arrangement according to the present invention is used to measure twists and rotations, the angle which characterizes the rotation or the twists representing the measured variable. The sensor arrangement includes an angle sensor which has a multipolar design, so that measurements over n poles are made possible. In this case, n represents a natural number which is greater than 1. The multipolarity results in the fact that the angle sensor facilitates absolute angle measurements within rotation angles of the size 360°/n. Of course, angles greater than 360°/n may also be measured, for example with the aid of incremental measuring steps. The sensor according to the present invention is suitable, in particular, for measuring rotation angles of a multipolar electric motor, the angle sensor and the electric motor having the same number of poles. In this case, it is always known, by activating the motor, in which of the n number of circumferential sections of the full circle the angle to be measured is provided.

The angle sensor initially includes a sensor ring surrounding a rotation axis and a material measure which is rotatable relative to this sensor ring. At least one transmitter coil and multiple receiver coils are situated on the sensor ring. A magnetic circuit, with the aid of which a signal is transmittable, is provided between the transmitter coil and the receiver coils. The rotatable material measure forms one part of the magnetic circuit. The rotatable material measure forms a variable reluctance in the magnetic circuit with respect to individual receiver coils. This results in the fact that the reluctance of the magnetic circuit changes for the individual receiver coils when the material measure rotates around the rotation axis. The change in the reluctance of the magnetic circuit is dependent on the rotation angle of the rotatable material measure.

The magnetic circuit is furthermore formed by an annular pot core, which preferably has a U-shaped cross section in a plane which includes the rotation axis. The annular shape of the pot core is preferably situated coaxially to the rotation axis. The transmitter coil is situated within the pot core. The pot core has two legs, which, in turn, also have an annular shape. The material measure is designed as a ring which closes the magnetic circuit between the annular legs of the pot core. The annular legs are preferably provided coaxially to the rotation axis.

The receiver coils are each situated partially inside and partially outside the pot core. Consequently, the receiver coils are each situated partially between the two legs of the pot core. One of the two annular legs of the pot core is provided with a segmented design, so that it includes ring segments. The outer leg preferably has a segmented design. The ring segments are preferably situated coaxially to the rotation axis. The receiver coils each surround at least one of the ring segments of the pot core. The ring segments each essentially have the shape of a circular arc. In any case, the ring segments each form a circular arc whose center point is situated in the rotation axis. The circular arcs are each characterized by a center point angle which describes the opening relative to the center point. The angle position of the circular arc with respect to the rotation axis may be described by a center radius which forms an axis of symmetry of the particular circular arc. The center radius includes the center point of the circular arc in the rotation axis and a central point on the circumference of the circular arc.

The multipolarity of the angle sensor facilitates absolute angle measurements within rotation angles of 360°/n between the material measure and the sensor. This is achieved, according to the present invention, by the fact that the center radii of the circular arcs of two adjacent ring segments each have an angle to each other which is the integral or a multiple of the nth fraction of the right angle. The selection of the integral factor for the nth fraction of the right angle may take place as a function of the practical feasibility. The selection of the factor is determined, for example, by the extension of the receiver coils.

One particular advantage of the sensor arrangement according to the present invention is that the generic angle sensor facilitates a multipolar angle measurement for the first time.

The sensor arrangement according to the present invention preferably includes at least four of the ring segments of the pot core. The angle positions of the ring segments are described below, reference being made to a reference angle position, which is, in principle, freely selectable. The reference angle position may coincide with an axis of symmetry of the arrangement of the receiver coils. However, the reference angle position may also be situated in an arbitrary position with the extension of one of the receiver coils. In these preferred specific embodiments, the center radius of the circular arc of a first of the ring segments has an angle of $(45°+a·360°)/n$ with respect to the reference angle position. In this case, a is a natural number, the natural numbers here being understood to include the number zero. The center radius of the circular arc of a second of the ring segments has an angle of $(225°+b·360°)/n$ with respect to the reference angle position, b being a natural number. The center radius of a third of the ring segments has an angle of $-(225°+c·360°)/n$ with respect to the reference angle position, c being a natural number. Finally, the center radius of the circular arc of a fourth of the ring segments has an angle of $-(45°+d·360°)/n$ with respect to the reference angle position, d being a natural number. The angle vertices of the indicated angle are situated, in principle, in the rotation axis. The center radii and the ray defined by the reference angle position are situated in a plane perpendicular to the rotation axis. According to the present invention, factors a, b, c and d may be freely selected to ensure the practical feasibility of the sensor arrangement.

The center radius of the circular arc of the first ring segment is preferably situated in the first quadrant with respect to the reference angle position. The center radius of the circular arc of the second ring segment is preferably situated in the second quadrant with respect to the reference angle position. The center radius of the circular arc of the third ring segment is preferably situated in the third quadrant with respect to the reference angle position. Finally, the center radius of the circular arc of the fourth ring segment is preferably situated in the fourth quadrant with respect to the reference angle position. In this case, the four quadrants indicated are counted in a counterclockwise direction, starting from the reference angle position. The indicated distribution of the ring segments to the four quadrants may be achieved, among other things, by the selection of factors a, b, c and d.

The number of ring segments is not directly linked to the number of poles. However, sensor arrangements according to the present invention having a larger number of poles, for example n≥8, preferably also have a larger number of ring segments, since the center point angles become smaller as the number of poles increases, so that the magnetic resistance of the magnetic circuit does not drop too much due to the increasing number of ring segments. Preferred specific embodiments of the sensor arrangement according to the present invention therefore have at least eight of the ring segments, the first four of the ring segments occupying the angle positions indicated above between the particular center radius and the reference angle position. The center radius of the circular arc of a fifth of the ring segments furthermore has an angle of $(45°+a·360°)/n+180°$ with respect to the reference angle position. The center radius of the circular arc of a sixth of the ring segments preferably has an angle of (225°+b·360°)/n+180° with respect to the reference angle position. The center radius of the circular arc of a seventh of the ring segments preferably has an angle of −(225°+c·360°)/n−180° with respect to the reference angle position. Finally, the center radius of the circular arc of an eighth of the ring segments preferably has an angle of −(45°+d·360°)/n−180° with respect to the reference angle position.

In the specific embodiments having eight of the ring segments, the center radius of the circular arc of the first ring segment and the center radius of the second ring segment are preferably situated in the first quadrant with respect to the reference angle position. The center radius of the circular arc of the seventh ring segment and the center radius of the circular arc of the eighth ring segment are furthermore preferably situated in the second quadrant with respect to the reference angle position. The center radius of the circular arc of the fifth ring segment and the center radius of the circular arc of the sixth ring segment are furthermore preferably situated in the third quadrant with respect to the reference angle position. Finally, the center radius of the circular arc of the third ring segment and the center radius of the circular arc of the fourth ring segment are furthermore preferably situated in the fourth quadrant with respect to the reference angle position. The indicated distribution of the ring segments to the four quadrants may be achieved, among other things, by the selection of factors a, b, c and d.

The sensor arrangement according to the present invention may also have more than eight of the ring segments, the additional ring segments preferably having the angle position indicated above, for which purpose deviating factors a, b, c and d must be selected accordingly.

The receiver coils are preferably formed by sine coils and cosine coils. The terms, "sine coils" and "cosine coil" are known from the related art, for example, from WO 2011/134955 A2.

The sine coils are preferably designed in pairs, each pair of sine coils including a positive sine coil and a negative sine coil. The signals, which are measurable with the aid of the positive sine coil and the negative sine coil during the rotation of the material measure with respect to the sensor ring, have an electrical period which represents a rotation angle of 360°/n between the material measure and the sensor ring. In the same way, the cosine coils are preferably designed in pairs, each pair of cosine coils including a positive cosine coil and a negative cosine coil. The signals, which are measurable with the aid of the positive cosine coil and the negative cosine coil during the rotation of the material measure with respect to the sensor ring, have an electrical period which represents a rotation angle of 360°/n between the material measure and the sensor ring.

In the specific embodiments mentioned above, in which four of the ring segments are distributed to the four quadrants, and which include one pair of sine coils and one pair of cosine coils, the positive sine coil preferably surrounds the first ring segment. The negative sine coil preferably surrounds the second ring segment. The negative cosine coil preferably surrounds the third ring segment. Finally, the positive cosine coil preferably surrounds the fourth ring segment. The aforementioned assignment of sine coils and cosine coils to the ring segments is particularly preferably established if the sensor arrangement according to the present invention includes exactly one pair of sine coils, exactly one pair of cosine coils and exactly four of the ring segments.

In the above-mentioned specific embodiments of the sensor arrangement according to the present invention, including eight of the ring segments, the sensor arrangement preferably includes two pairs of sine coils and two pairs of cosine coils. The positive sine coil of the first of the two pairs of sine coils preferably surrounds the first ring segment. The negative sine coil of the first of the two pairs of sine coils preferably surrounds the second ring segment. The negative cosine coil of the first of the two pairs of cosine coils preferably surrounds the third ring segment. The positive cosine coil of the first of the two pairs of cosine coils preferably surrounds the fourth ring segment. The positive sine coil of the second of the two pairs of sine coils preferably surrounds the fifth ring segment. The negative sine coil of the second of the two pairs of sine coils preferably surrounds the sixth ring segment. The negative cosine coil of the second of the two pairs of cosine coils preferably surrounds the seventh ring segment. Finally, the positive cosine coil of the second of the two pairs of cosine coils preferably surrounds the eighth ring segment. In the aforementioned assignment of the sine and cosine coils to the eight ring segments, the sensor arrangement according to the present invention particularly preferably includes exactly two pairs of sine coils, exactly two pairs of cosine coils and exactly eight of the ring segments.

In preferred specific embodiments of the sensor arrangement according to the present invention, the circular arcs of the ring segments each have a center point angle which is equal to the nth fraction of the right angle. However, it may be advantageous for the technical feasibility that the circular arcs of the ring segments each have a center point angle which is smaller than the nth fraction of the right angle.

The receiver coils are preferable situated circumferentially along the segment-like, annular leg of the pot core, with respect to the rotation axis. The receiver coils are thus each equidistant from the rotation axis. The receiver coils are particularly preferably situated equidistantly along the segment-like, annular leg of the pot core, with respect to the rotation axis.

In preferred specific embodiments of the sensor arrangement according to the present invention, each of the ring segments is surrounded by exactly one of the receiver coils. However, it may be advantageous for each of the receiver coils to surround multiple ring segments, in particular in angle sensors of the sensor arrangement according to the present invention having a larger number of poles. This is due to the fact that the center point angles of the ring segments are comparatively small in angle sensors having a larger number of poles. In these specific embodiments, each of the receiver coils surrounds an m number of ring segments, wherein m≤max (1; |n/4|). In this case, |n/4| describes the integral portion of n/4.

The material measure preferably has an annular cross section perpendicular to the rotation axis, so that it is formed by a ring which has n circumferential sections of the same length circumferentially along its annular shape. In each of these circumferential sections, the size of a ring width of the ring increases from a minimum ring width to a maximum ring width and then decreases back to the minimum ring width. A ring of an eccentric design is provided hereby, which has n maxima and n minima. The variable ring width may be effectuated by a variable outer radius of the ring or by a variable inner radius of the ring. The ring preferably has both a variable inner radius and a variable outer radius to effectuate the variable ring width. A double eccentric shape is achieved hereby.

The rolling bearing arrangement according to the present invention initially includes a rolling bearing having a first bearing ring and a second bearing ring which is rotatable with respect to the first bearing ring. The rolling bearing arrangement furthermore includes the sensor arrangement according to the present invention, the sensor ring being coupled with the first bearing ring and the material measure being rotatably fixedly connected to the second bearing ring. The coupling of the sensor ring with the first bearing ring results in the fact that the sensor ring is rotatably fixedly connectable to a machine element which accommodates the first bearing ring. Consequently, the sensor arrangement is used to measure a rotation angle between a machine element accommodated by the second bearing ring with respect to the machine element accommodating the first bearing ring.

Rolling elements are preferably situated between the first bearing ring and the second bearing ring.

The first bearing ring is preferably formed by a bearing outer ring, while the second bearing ring is preferably formed by a bearing inner ring.

Further advantages, details and refinements of the present invention result from the following description of preferred specific embodiments of the present invention, with reference to the drawing.

DETAILED DESCRIPTION

Figure 1:
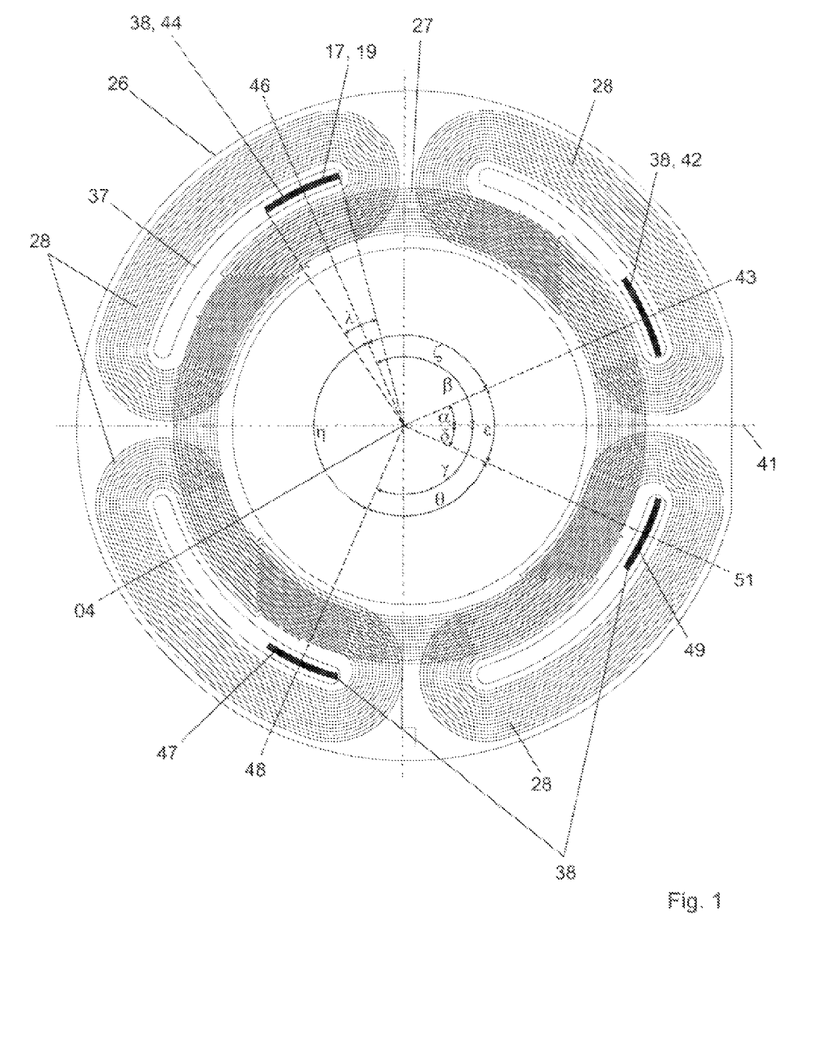
FIG. 1: shows a p.c. board and four ring segments of one preferred specific embodiment of the sensor arrangement according to the present invention.

FIG. 1 shows p.c. board 26 and four ring segments 38 in one preferred specific embodiment of the sensor arrangement according to the present invention. This specific embodiment of the sensor arrangement according to the present invention is similar in structure to angle sensor 02 illustrated in FIGS. 2 through 4 and differs only in the design of material measure 14 and ring segments 38 (see FIG. 4). The sensor arrangement according to the present invention also preferably provides a rolling bearing arrangement together with rolling bearing 01 illustrated in FIG. 2.

The embodiment of ring segments 38 illustrated in FIG. 1 results in the fact that the sensor arrangement represents a bipolar angle sensor in which n=2. The bipolar angle sensor is used for the absolute measurement of angles in the range from 0° to 360°/n; i.e., from 0° to 180°.

The representation shown in FIG. 1 is comparable to the representation in FIG. 4, which shows p.c. board 26, including four ring segments 38, in a monopolar design according to the prior art. Transmitter coil 27 and four receiver coils 28 are therefore shown in the same manner.

To illustrate the different angle positions of ring segments 38, a reference angle position 41 is marked to be able to indicate angles with respect to rotation axis 04. In the illustrated specific embodiment, reference angle position 41 is situated symmetrically between receiver coils 28, so that reference angle position 41 simultaneously represents a reference position for the angle measurement using the sensor arrangement according to the present invention. As a result, reference angle position 41 corresponds to measured value 0° of the sensor arrangement. However, the reference angle position may also be selected at a different angle position. In particular the reference angle position may differ from reference angle position 0° of the sensor arrangement.

A first ring segment 42 of four ring segments 38 includes a center radius 43, which has an angle α with respect to reference angle position 41. A second ring segment 44 of four ring segments 38 includes a center radius 46, which has an angle β with respect to reference angle position 41. A third ring segment 47 of four ring segments 38 includes a center radius 48, which has an angle γ with respect to reference angle position 41. A fourth ring segment 49 of four ring segments 38 includes a center radius 51, which has an angle δ with respect to reference angle position 41.

According to the present invention, angle α has the size (45°+a·360°)/n, where n=2 applies to the illustrated bipolar sensor. According to the present invention, angle β equals (225°+b·360°)/n. According to the present invention, angle γ equals −(225°+c·360°)/n. According to the present invention, angle δ equals −(45°+d·360°)/n. Factors a, b, c and d are natural numbers and are greater than or equal to zero.

An angle ε stretches between center radius 43 of first ring segment 42 and center radius 51 of fourth ring segment 49. An angle ζ stretches between center radius 46 of second ring segment 44 and center radius 43 of first ring segment 42. An angle η stretches between center radius 48 of third ring segment 47 and center radius 46 of second ring segment 44. An angle θ stretches between center radius 51 of fourth ring segment 49 and center radius 48 of third ring segment 47. Angles ε, ζ, η and θ are each equal to an integral or a multiple of the nth fraction of the right angle, n=2 applying to the illustrated bipolar sensor.

Four ring segments 38 each have the shape of a circular arc. Circular arcs each have a center point angle λ, which is illustrated on the basis of the example of second ring segment 44. Center point angle λ may be up to 90°/n in size. In the practical embodiment, the center point angle of ring segments 38 is reduced in many cases, in particular due to the extension of receiver coils 28.

Receiver coil 28 surrounding first ring segment 42 is a positive sine coil. Receiver coil 28 surrounding second ring segment 44 is a negative sine coil. Receiver coil 28 surrounding third ring segment 47 is a negative cosine coil. Receiver coil 28 surrounding fourth ring segment 49 is a positive cosine coil.

Figure 11:
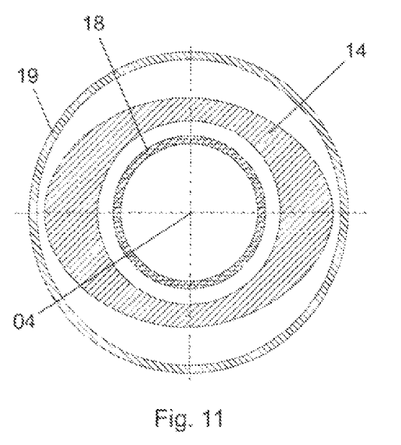
FIG. 11: shows a material measure of a preferred specific embodiment of the sensor arrangement according to the present invention.
Figure 12:
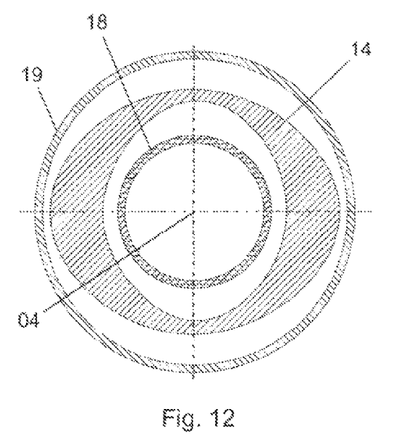
FIG. 12: shows a material measure of a particularly preferred specific embodiment of the sensor arrangement according to the present invention.

The illustrated embodiment of p.c. board 26, including four ring segments 38, for providing a bipolar angle sensor of the sensor arrangement according to the present invention interacts with material measure 14, as illustrated in different embodiments in FIGS. 11 and 12.

Figure 5:
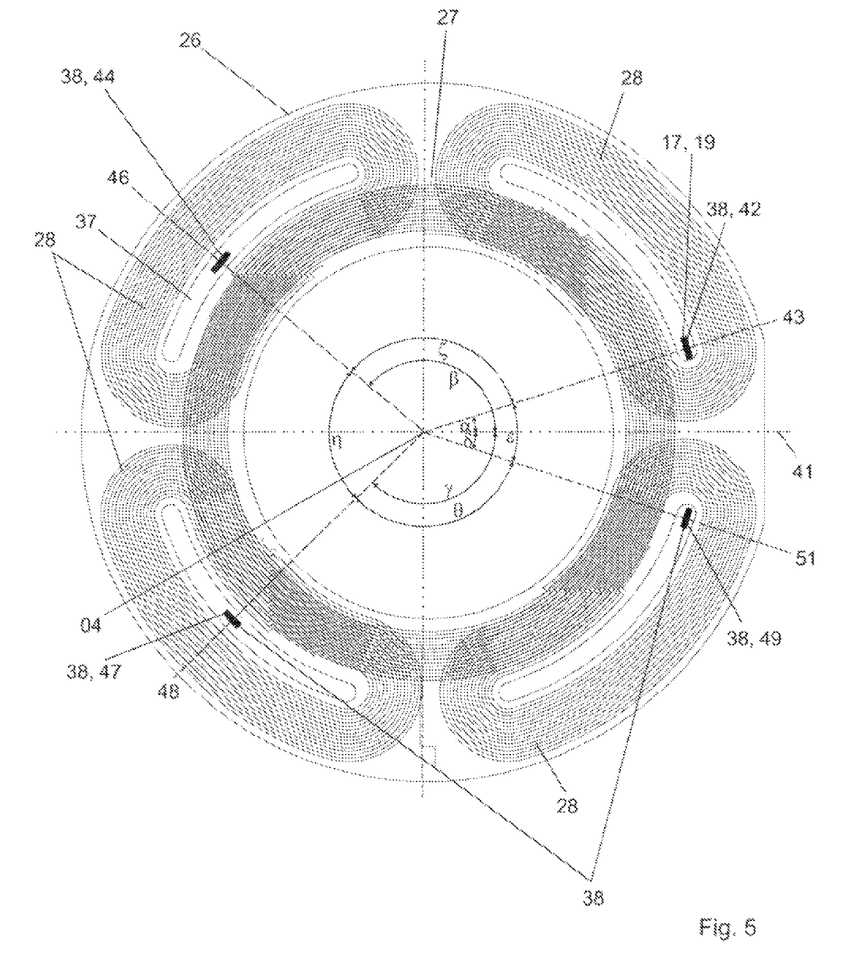
FIG. 5: shows a p.c. board and four ring segments of one preferred specific embodiment of the sensor arrangement according to the present invention, including a quadripolar angle sensor.

FIG. 5 shows p.c. board 26 and four ring segments 38 in one preferred specific embodiment of the sensor arrangement according to the present invention, including a quadripolar angle sensor. This embodiment is similar to the embodiment illustrated in FIG. 1, with the provision that n=4. Incidentally, other values may be selected for factors a, b, c and d.

Figure 6:
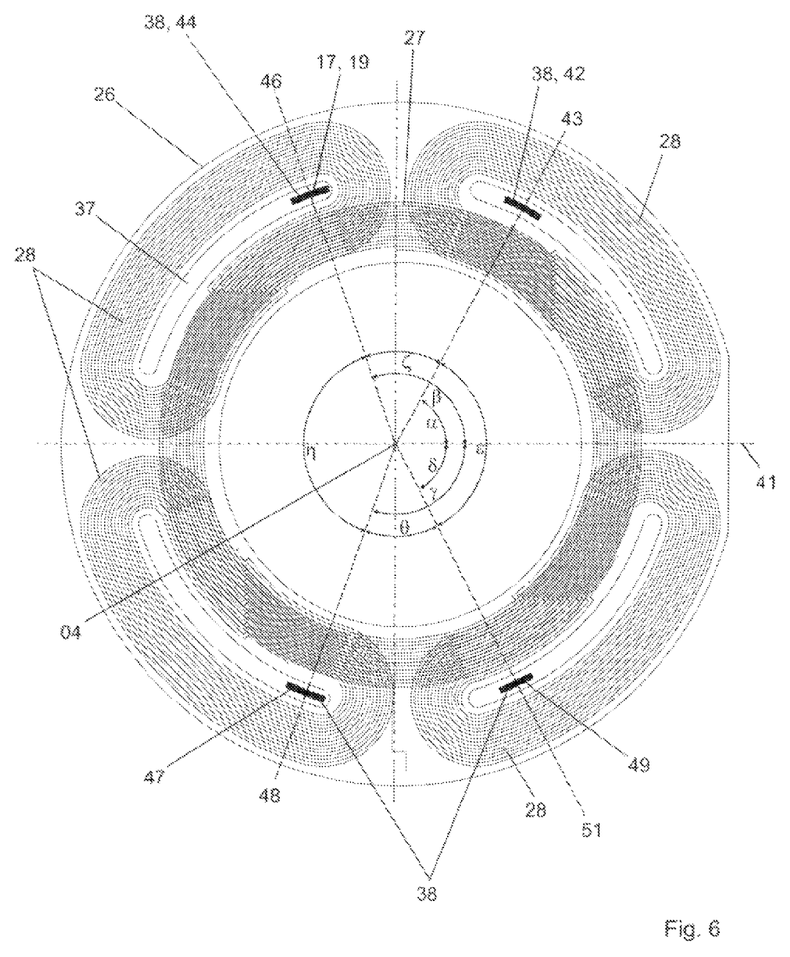
FIG. 6: shows a p.c. board and four ring segments of one preferred specific embodiment of the sensor arrangement according to the present invention, including an eight-pole angle sensor.

FIG. 6 shows p.c. board 26 and four ring segments 38 in another preferred specific embodiment of the sensor arrangement according to the present invention, including an eight-pole angle sensor. This embodiment is similar to the embodiment illustrated in FIG. 1, with the provision that n=8. Incidentally, other values may be selected for factors a, b, c and d.

Figure 7:
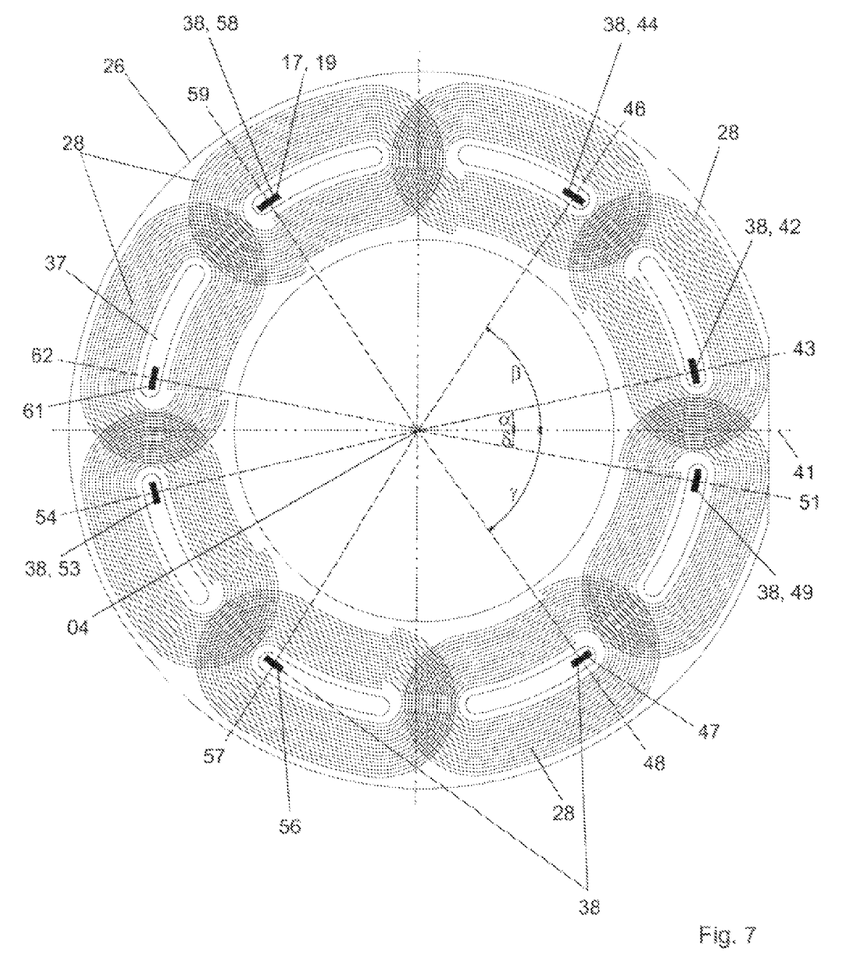
FIG. 7: shows a p.c. board and eight ring segments of one preferred specific embodiment of the sensor arrangement according to the present invention, including a quadripolar angle sensor.

FIG. 7 shows p.c. board 26 and eight ring segments 38 in another preferred specific embodiment of the sensor arrangement according to the present invention, including a quadripolar angle sensor. This specific embodiment includes eight of receiver coils 28 and eight of ring segments 38. Consequently, this specific embodiment includes, in addition to ring segments 42, 44, 47, 49 illustrated in FIG. 1, a fifth ring segment 53 of ring segments 38, which has a center radius 54. A sixth ring segment 56 of ring segments 38 has a center radius 57. A seventh ring segment 58 of ring segments 38 has a center radius 59. An eighth ring segment 61 of ring segments 38 has a center radius 62. The arrangement of first four ring segments 42, 44, 47, 49 is similar to the arrangement illustrated in FIG. 1, with the provision that n=4, factors a, b, c and d being selected accordingly. Fifth ring segment 53 is offset 180° with respect to first ring segment 42. Sixth ring segment 56 is offset 180° with respect to second ring segment 44. Seventh ring segment 58 is offset 180° with respect to third ring segment 47. Eighth ring segment 61 is offset 180° with respect to fourth ring segment 49.

Receiver coil 28 surrounding fifth ring segment 53 is formed by a positive sine coil. Receiver coil 28 surrounding sixth ring segment 56 is formed by a negative sine coil. Receiver coil 28 surrounding seventh ring segment 58 is formed by a negative cosine coil. Receiver coil 28 surrounding eighth ring segment 61 is formed by a positive cosine coil.

Figure 8:
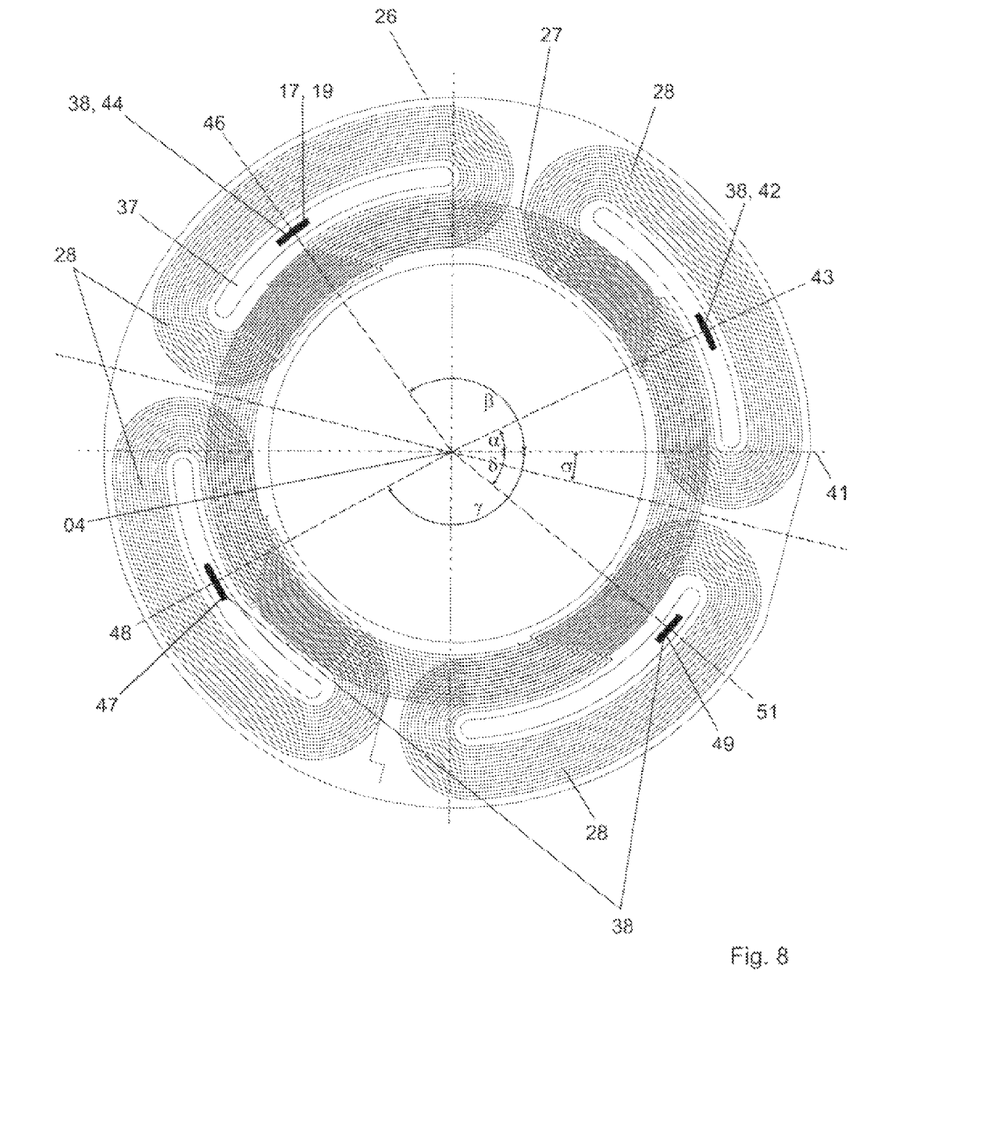
FIG. 8: shows a p.c. board and four ring segments of a modified specific embodiment of the sensor arrangement according to the present invention, including an eight-pole angle sensor.

FIG. 8 shows p.c. board 26 and four ring segments 38 in a modified specific embodiment of the sensor arrangement according to the present invention, including an eight-pole angle sensor. The arrangement of four ring segments 38 with respect to reference angle position 41 is similar to the representation shown in FIG. 1, with the provision that n=8. Another difference is that reference angle position 41 does not coincide with a line of symmetry of p.c. board 26 but has an offset angle σ thereto. Offset angle σ is irrelevant for the function of the sensor arrangement according to the present invention.

FIG. 11 shows material measure 14 in one particularly preferred specific embodiment of the sensor arrangement according to the present invention. Material measure 14 is a material measure of a bipolar angle sensor. The view in FIG. 11 is similar to the views in FIGS. 9 and 10, which show material measures 14 according to the prior art.

Material measure 14 has an eccentric design, a ring width of annular material measure 14 having two minima and two maxima along its circumference. One of the maxima and one of the minima are each situated in a circumferential section of 180°.

The material measure in specific embodiments of the sensor arrangement according to the present invention for other numbers of poles n correspondingly have n of the maxima and n of the minima of the ring width, one of the maxima and one of the minima being each situated in a circumferential section of 360°/n.

FIG. 12 shows material measure 14 in one particularly preferred specific embodiment of the sensor arrangement according to the present invention. Material measure 14 illustrated in FIG. 12 differs from the material measure illustrated in FIG. 11 in that it has a double eccentric design. While the eccentricity of the material measure illustrated in FIG. 11 is effectuated only by varying the outer radius of annular material measure 14, in the material measure illustrated in FIG. 12, the eccentricity is effectuated by varying the outer radius as well as by varying the inner radius of the annular shape of material measure 14.

LIST OF REFERENCE NUMERALS 01 rolling bearing
02 angle sensor
03 inner ring
04 rotation axis
05 -
06 outer ring
07 rolling element
08 cage
09 sealing washer
10 -
11 sensor ring
12 holding element
13 circumferential groove in outer ring
14 material measure
15 -
16 circumferential groove in inner ring
17 U-shaped pot core
18 inner U-leg
19 outer U-leg
20 -
21 U-base
22 inner supporting ring
23 outer supporting ring
24 annular space
25 -
26 p.c. board
27 transmitter coil
28 receiver coils
29 cable
30 -
31 cable holder
32 recess in outer supporting ring
33 -
34 -
35 -
36 printed conductors
37 openings in p.c. board
38 ring segments
39 -
40 -

41 reference angle position
42 first ring segment
43 center radius of first ring segment
44 second ring segment
45 -
46 center radius of second ring segment
47 third ring segment
48 center radius of third ring segment
49 fourth ring segment
50 -
51 center radius of fourth ring segment
52 -
53 fifth ring segment
54 center radius of fifth ring segment
55 -
56 sixth ring segment
57 center radius of sixth ring segment
58 seventh ring segment
59 center radius of seventh ring segment
60 -
61 eighth ring segment
62 center radius of eighth ring segment

The invention claimed is:

1. A sensor arrangement comprising:
an angle sensor including a sensor ring surrounding a rotation axis and a material measure rotatable relative thereto;
at least one transmitter coil and multiple receiver coils being situated on the sensor ring, a signal being transmittable between the transmitter coil and the receiver coils via a magnetic circuit, and the rotatable material measure forming a variable reluctance in the magnetic circuit;
the transmitter coil being situated in an annular pot core forming one part of the magnetic circuit;
the material measure being designed as a ring which closes the magnetic circuit between two annular legs of the pot core;
the receiver coils each being situated partially within and partially outside the pot core, one of the annular legs of the pot core having a segmented design, so that the one annular leg includes ring segments, the receiver coils each surrounding at least one of the ring segments; and
the ring segments each forming a circular arc with respect to the rotation axis and spaced apart in a circumferential direction, at least some of the ring segments being spaced apart unevenly in the circumferential direction, a center radius of the particular circular arc each forming an axis of symmetry of the particular circular arc;
the angle sensor having a multipolar design for a measurement over n poles, the center radii of the circular arcs of two adjacent ring segments each having an angle with respect to each other, the angle being the integral or a multiple of the nth fraction of the right angle.

2. The sensor arrangement as recited in claim 1 wherein the center radius of the circular arc of a first of the ring segments has an angle ($\alpha$) of $(45°+a·360°)/n$ with respect to a reference angle position, a being a natural number;
the center radius of the circular arc of a second of the ring segments having an angle ($\beta$) of $(225°+b·360°)/n$ with respect to the reference angle position, b being a natural number;
the center radius of the circular arc of a third of the ring segments having an angle ($\gamma$) of $-(225°+c·360°)/n$ with respect to the reference angle position, c being a natural number; and
the center radius of the circular arc of a fourth of the ring segments having an angle ($\sigma$) of $-(45°+d·360°)/n$ with respect to the reference angle position, d being a natural number n being the number of n poles.

3. The sensor arrangement as recited in claim 2 wherein the center radius of the circular arc of the first ring segment is situated in a first quadrant with respect to the reference angle position; the center radius of the circular arc of the second ring segment being situated in a second quadrant with respect to the reference angle position; the center radius of the circular arc of the third ring segment being situated in a third quadrant with respect to the reference angle position; and the center radius of the circular arc of a fourth ring segment being situated in the fourth quadrant with respect to the reference angle position.

4. The sensor arrangement as recited in claim 1 wherein the receiver coils are formed by sine coils and cosine coils.

5. The sensor arrangement as recited in claim 4 wherein the sine coils are provided in pairs, each of the pairs of sine coils including a positive sine coil and a negative sine coil, signals measurable with the aid of the positive sine coils and signals measurable with the aid of the negative sine coil during the rotation of the material measure with respect to the sensor ring having an electrical period representing a rotation angle of $360°/n$ between the material measure and the sensor ring; the cosine coils furthermore also being provided in pairs, each of the pairs of cosine coils including a positive cosine coil and a negative cosine coil, signals measurable with the aid of the positive cosine coil and signals measurable with the aid of the negative cosine coil during the rotation of the material measure with respect to the sensor ring having an electrical period which represents a rotation angle of $360°/n$ between the material measure and the sensor ring.

6. The sensor arrangement as recited in claim 5 wherein the positive sine coil surrounds a first ring segment; the negative sine coil surrounding second ring segment; the negative cosine coil surrounding a third ring segment; and the positive cosine coil surrounding a fourth ring segment and wherein the center radius of the circular arc of the first ring segment is situated in a first quadrant with respect to the reference angle position; the center radius of the circular arc of the second ring segment being situated in a second quadrant with respect to the reference angle position; the center radius of the circular arc of the third ring segment being situated in a third quadrant with respect to the reference angle position; and the center radius of the circular arc of a fourth ring segment being situated in the fourth quadrant with respect to the reference angle position.

7. The sensor arrangement as recited in claim 1 wherein the circular arcs of the ring segment each have a center point angle smaller or equal to the nth fraction of the right angle.

8. The sensor arrangement as recited in claim 1 wherein each of the receiver coils surrounds an m number of ring segments, where $m \leq \max(1; |n/4|)$.

9. The sensor arrangement as recited in claim 1 wherein the material measure has an annular cross section perpendicular to the rotation axis, the material measure having n circumferential sections of equal length circumferentially along the annular shape, the size of a ring width within each of the n circumferential sections increasing from a minimum ring width to a maximum ring width and decreasing back to the minimum ring width.

10. A rolling bearing arrangement comprising:
a rolling bearing including a first bearing ring and a second bearing ring rotatable with respect to the first bearing ring; and
a sensor arrangement as recited in claim 1, the sensor ring being coupled with the first bearing ring, and the material measure being rotatably fixedly connected to the second bearing ring.

11. The sensor arrangement as recited in claim 1 wherein the material measure has an annular cross section perpendicular to the rotation axis, the material measure having at least two circumferential sections of equal length circumferentially along the annular shape, the size of a ring width within each of the circumferential sections having a maximum, the at least two circumferential sections meeting at a minimum of the right width.

\* \* \* \* \*